United States Patent

[11] 3,623,132

[72] Inventor Robert D. Green
Anaheim, Calif.
[21] Appl. No. 979,810
[22] Filed Dec. 14, 1970
[45] Patented Nov. 23, 1971
[73] Assignee North American Rockwell Corporation

[54] CHARGE SENSING CIRCUIT
9 Claims, 6 Drawing Figs.

[52] U.S. Cl. .......... 307/205, 307/246, 307/251
[51] Int. Cl. .......... H03k 19/08, H03k 19/40
[50] Field of Search .......... 307/205, 208, 246, 251

[56] References Cited
UNITED STATES PATENTS

| | | | |
|---|---|---|---|
| 3,457,435 | 7/1969 | Burns et al. | 307/205 X |
| 3,524,077 | 8/1970 | Kaufman | 307/251 X |
| 3,564,290 | 2/1971 | Sonoda | 307/205 X |
| 3,575,613 | 4/1971 | Ebertin | 307/205 X |
| 3,575,614 | 4/1971 | Polkinghorn et al. | 307/251 |

*Primary Examiner*—John S. Heyman
*Attorney*—L. Lee Humphries, H. Fredrick Hamann and Robert G. Rogers

ABSTRACT: A first field effect transistor is turned on during a first phase recurring interval for charging a first capacitor at the gate electrode of an output field effect transistor. During a second phase recurring interval, a second field effect transistor in series between the plate of a second capacitor and the first capacitor, is turned on. The voltage on the first capacitor is connected to the plate of the second capacitor for inverting or depleting the semiconductor region subjacent the plate of the second capacitor. If minority carriers are available in the semiconductor substrate adjacent to the region covered by the plate, the subjacent region is inverted and electrically connected to a charge coupled circuit. If an inversion does not occur, the voltage on the first capacitor is unchanged and the output field effect transistor remains on for indicating the absence of charge (minority carriers) on the charge coupled circuit. If the charge coupled circuit provides minority carriers to the second capacitor, the voltage on the first capacitor is reduced and the output field effect transistor is turned off for indicating the presence of charge on the charge coupled circuit.

INVENTOR
ROBERT D. GREEN
BY Robert G. Rogers
ATTORNEY

INVENTOR
ROBERT D. GREEN
BY Robert G. Rogers
ATTORNEY

INVENTOR
ROBERT D. GREEN
BY Robert G. Rogers
ATTORNEY

CHARGE SENSING CIRCUIT

BACKGROUND OF THE INVENTION

1. Field of the Invention

The invention relates to a circuit for sensing the charge of a charge coupled circuit and more particularly to such a circuit using a plurality of clocked field effect transistors for providing an output indicating the charge on the charge coupled circuit.

2. Description of Prior Art

Patent application Serial No. 804,171, filed March 4, 1969, by Robert K. Booher et al. for a Field Effect Conditionally Switched Capacitor describes and claims a circuit using the inversion effect in a semiconductor substrate subjacent a capacitor plate for storage purposes: A voltage on a fixed capacitor plate causes an inversion to occur in the semiconductor substrate region subjacent the fixed plate. The inverted region comprises the second plate of the capacitor. The fixed plate is insulated from the substrate.

In certain circuit applications, it is desirable to sense the charge in an inversion layer under the capacitor plate. Circuits utilizing the coupling of charge from one inversion layer in a substrate to an adjacent inversion layer under an adjacent fixed capacitor plate may be referred to as charge coupled circuits. Minority carriers, for example, from a diffused region are stored as capacitor charge and shifted from one capacitor to another capacitor through inversion layers to an output. It is necessary to sense the charge of the charge coupled circuit for enabling normal circuit operations or for restoring the charge to a required operating level. In some cases, losses occur as the charge is shifted from one capacitor to another capacitor. Shift registers and other logic circuits may be implemented using charge coupled circuitry.

By way of background information, it is pointed out that a field effect capacitor forms a depletion region (void of majority or minority carriers) when an appropriate bias is applied. This depletion region may be quite wide so that the total capacitance, $C_T$, between the fixed conductor and the substrate bias (ground) is low (often about one-tenth to one-eighth the value of the capacitance of the dielectric layer ($C_{dielectric}$) between the fixed plate and the substrate).

The total capacitance is comprised of the dielectric capacitance and the depletion region capacitance, $C_{depl}$, $$C_{Total}=\frac{C_{diel}C_{depl}}{C_{diel}+C_{depl}}$$

After some time (seconds to minutes) enough minority carriers (holes for p channel devices) accumulate to form an inversion layer. The capacitance value $C_T$ can then drop to about one third of $C_{dielectric}$ (for typical substrate doping). However, if there is a source of minority carriers such as a diffusion or an adjacent inversion region, an inversion region forms immediately ( in the order of nanoseconds for some designs) and the capacitance goes to $\approx (1/3)C_{diel}$. In all cases, this inversion layer is electrically isolated in a charge coupled circuit so that it cannot change it potential with respect to the fixed gate. Thus in a charged coupled circuit, the total capacitance will change some what when the field effect capacitor is connected in parallel with a reference capacitor, $C_{ref}$, in the present invention. The change in total capacitance and therefore voltage on the reference capacitance for the two cases of interest is shown below:

No Charge $$C_{Total}\approx C_{ref}+\frac{C_{diel}}{8}$$

Charge $$C_{Total}\approx C_{ref}+C_{diel}$$

Thus with equal charges $C_{ref}$ initially for both cases, $$Q=CV$$

$$V_{\text{no charge}}\left(C_{ref}+\frac{C_{diel}}{8}\right)=\left(C_{ref}+\frac{C_{diel}}{3}\right)V_{\text{(charge)}}$$

$$\frac{V_{\text{(charge)}}}{V_{\text{(no charge)}}}=\frac{C_{ref}+C_{diel/8}}{C_{ref}+C_{diel/3}}=\frac{1+\frac{C_{diel}}{8C_{ref}}}{1+\frac{C_{diel}}{3C_{ref}}}$$

A circuit is required therefore to sense the charge of the charge coupled circuit for providing an output or for enabling the charge to be restored to an operating level. The present invention provides such a circuit.

SUMMARY OF THE INVENTION

Briefly, the invention comprises a first field effect transistor turned on during a first phase recurring interval for charging a first capacitor at the gate electrode of an output field effect transistor. During a second phase recurring interval, a second field effect transistor is turned on for coupling the first capacitor to a second capacitor at the output of a charge coupled circuit. The voltage on the first capacitor causes an inversion or depletion under the fixed plate of the second capacitor. If the charge coupled circuit is charged i.e. has minority carriers, an inversion region is formed under the fixed plate and electrically connects the second capacitor to the charge coupled circuit. Normally the charge coupled circuit is charged when a logic one is provided at the input to the circuit. If the inversion layer is formed, the voltage on the first capacitor is substantially reduced and the output transistor is turned off. If the charge coupled circuit is not charged, as when a logic zero is provided at an input to the charge coupled circuit, the semiconductor substrate beneath the second capacitor plate is only depleted. The voltage on the first capacitor is reduced only slightly and the output field effect transistor remains on. The logic state of the charge coupled circuit is sensed by determining whether or not the output field effect transistor remains on or is turned off.

The output field effect transistor can be utilized in different circuit arrangements. For example, the output field effect transistor can be connected in series with a clocked field effect transistor for forming either an inverter or a source follower. In either case, the output voltage level controlled by the output field effect transistor indicates the charge, or lack of charge on the charge coupled circuit.

Following the second phase recurring interval, the charge on the fixed plate of the second capacitor is discharged to a reference potential such as electrical ground. A third field effect transistor actuated during a third phase recurring interval may be used. Alternately, if the first and second phase recurring intervals, equivalent to clock pulses, or separated in time, the third field effect transistor can be turned on by the first phase recurring clock signal.

In certain embodiments, the charge in the substrate subjacent the fixed plate is also discharged to electrical ground by a fourth field effect device formed adjacent to the fixed plate. The fourth device is also gated by a clock for synchronizing the discharge with the discharge of the charge on the fixed plate. In the preferred embodiment the charge coupled circuit and the charge sensing circuit are formed on the same substrate. In other embodiments, portions of both circuits may be on different semiconductor substrates.

It is an object of this invention to provide an improved field effect transistor circuit for sensing charge at the output of a charge coupled circuit.

It is another object of this invention to provide a monolithic insulated gate field effect transistor circuit integrated on a semiconductor substrate with a charge coupled circuit which utilizes the concept of charge splitting for evaluating the logic state of the charge coupled circuit.

field effect transistor circuit for connecting first and second capacitors in parallel with one capacitor being electrically connected to the output of a charge coupled circuit for enabling the charge coupled circuit to provide charge to the capacitor as a function of the logic state of the charge coupled circuit.

It is another object of this invention to provide a field effect transistor for sensing the logic state of a charged coupled circuit in which one capacitor is precharged during a first phase recurring interval and is connected in parallel with a second capacitor during a second phase recurring interval for forming an inversion or depletion layer under the fixed plate of the second capacitor; the inversion layer is electrically connected to the output of a charge coupled circuit for receiving charge from the charge coupled circuit and the voltage on the first capacitor is changed.

A further object of this invention is to utilize a clocked field effect transistor circuit including a first capacitor and a second capacitor having a fixed plate and a second plate comprising an inversion or depletion layer in a semiconductor substrate forming a voltage capacitor having a capacitance determined as a function of the logic state of a charge coupled circuit Another object of this invention is to provide an improved charge sensing circuit including field effect devices for discharging the fixed plate and the substrate plate of a sensing capacitor to a reference potential after each sensing cycle.

These and other objects of this invention will become more apparent when taken in connection with the description of the drawings, a description of which follows:

DESCRIPTION OF PREFERRED EMBODIMENTS

Figure 1:
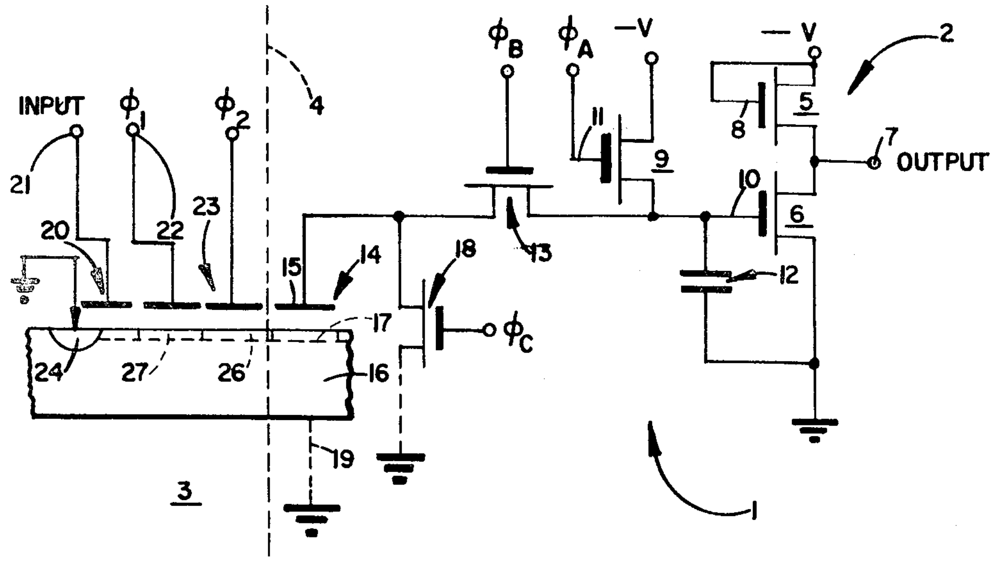
FIG. 1 is a partial schematic diagram of one embodiment of a field effect transistor circuit for sensing the state of a charge coupled circuit.

FIG. 1 is a partial schematic diagram of charge sensing circuit 1 comprising an output stage 2 and a charge coupled circuit 3. The charge coupled circuit is represented by the portion of the FIG. 1 schematic diagram to the left of the dashed line 4. The output stage 2 comprises field effect transistor 5 in series with output field effect transistor 6. Output terminal 7 is connected at a midpoint between the field effect transistors 5 and 6. Field effect transistors 5 and 6 connected between voltage source -V and electrical ground, form an inverter circuit. Field effect transistor 5 has its gate electrode 8 connected to voltage source -V for forming a load resistor. In other embodiments, field effect transistor 5 could be gated with a clock signal.

The charge-sensing circuit 1 also comprises field effect transistor 9 connected in electrical series between voltage source -V and the gate electrode 10 of field effect transistor 6. The gate electrode 11 of field effect transistor 9 is connected to phase recurring clock signal $0_A$. Capacitor 12, designated as a reference capacitor, $C_{ref}$, herein, is connected between gate electrode 10 and electrical ground.

Field effect transistor 13 is connected in series between gate electrode 10 and capacitor 14 at the output of the charge coupled circuit 3. Field effect transistor 13 is gated by phase recurring clock signal $0_B$.

Capacitor 14 is designated as a sensing capacitor, $C_{diel}$ herein. As indicated above, the sensing capacitor varies relative to the dielectric capacitance. For convenience the sensing capacitor is described in terms of the dielectric capacitance. Fixed plate 15 of capacitor 14 is disposed over semiconductor substrate 16 and insulated from the semiconductor substrate 16 for example by a silicon dioxide and/or a silicon nitride insulating layer. Other insulators may also be used. The second plate of the capacitor 14 comprises an inversion layer 17 which is formed in the semiconductor substrate if minority carriers are available in the substrate (see earlier background discussion). If minority carriers are not available from the charge coupled circuit, a depletion region is formed in the substrate region subjacent the fixed plate 14.

Field effect transistor 18 gated by clock signal $0_3$ is connected in parallel with capacitor 14 to electrical ground. The substrate 16 is also connected to electrical ground as illustrated by the dashed line connection 19.

The charge coupled circuit 3 is illustrated in the simple embodiment as comprising a carrier source 24 connected to input field effect device 21 and coupling capacitors 22 and 23 for shifting, or coupling, charge from the source 24 to the capacitor 14 of the charge sensing circuit 1. The minority carrier source 24 may comprise a diffused region in the substrate 16. The coupling capacitors 22 and 23 are implemented by fixed plates disposed over and insulated from the semiconductor substrate 16. The second plates of the capacitor comprise an inverted region subjacent the fixed plates if the input signal to field effect device 21 enables minority carriers to be injected under the fixed plates. Otherwise, the second plates comprise depletion regions. An inverted region signifies a logic one input and a depletion region signifies a logic zero input.

Figure 2:
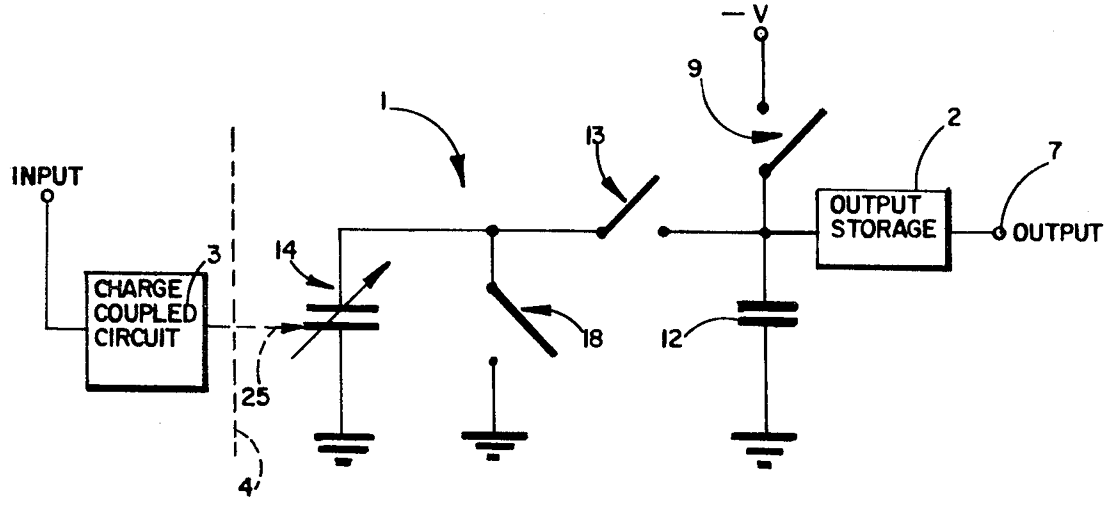
FIG. 2 is a schematic diagram of the FIG. 1 circuit showing switches instead of field effect transistors.

FIG. 2 is a simpler schematic diagram of the FIG. 1 circuit in which switches are substituted for the field effect transistors of FIG. 1. The output stage 2 and the charge coupled circuit 3 are illustrated in block form for indicating that circuits other than the output stage illustrated in FIG. 1 and the simple charge coupled circuit illustrated in FIG. 1 can be utilized with the charge sensing circuit 1. The capacitor 14 is illustrated as being a variable capacitor electrically connected to the charge coupled circuit via dashed line 25.

Figure 3:
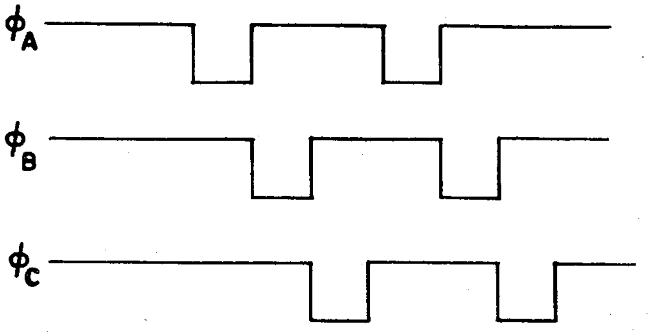
FIG. 3 is a signal diagram of the clock signals $0_A$, $0_B$, and $0_C$ which synchronize the operation of the FIG. 1 circuit.

The operation of the FIG. 1 circuit can best be illustrated by referring to FIGS. 1–3. During $0_A$, field effect transistor 9 is turned on for charging capacitor 12 to approximately -V. As a result, field effect transistor 6 is turned on and the output 7 for the FIG. 1 embodiment, is connected to the reference potential, electrical ground.

During $0_B$, field effect transistor 13 is turned on and the voltage across capacitor 12 is connected to fixed plate 15 of capacitor 14. The voltage causes an inversion or depletion region in the semiconductor substrate region 17 subjacent fixed plate 15 for forming the second plate of capacitor 14. The dashed line in FIG. 1 illustrates the depleted or inverted region of capacitor 14. The region 17 extends laterally in the substrate 16 so that it is electrically connected to the depletion or inversion layer 26 of the adjacent capacitor 23 of the charge coupled circuit 3. For purposes of this embodiment, capacitor 23 is assumed to be the output capacitor of the charged coupled circuit.

For purposes of describing an operating example of the FIG. 1 circuit, it is assumed that prior to $0_B$, and input signal was provided to input field effect device 21 of the charge coupled circuit 3. The input signal may have a signal level i.e. a voltage level representing either a logic one (true) state or a logic zero (false) state. It is also assumed that the $0_1$ and $0_2$ clock signals connected to the fixed plates of capacitors 22 and 23 became true consecutively for coupling the charge (minority carriers) introduced by the input signal to the capacitor 23. For example, if the input signal was true, during $0_1$, the charge from region 24 would have been stored in the inversion region 27 of capacitor 22. At the end of $0_1$, when the $0_2$ clock signal became true, the charge would have been shifted, or coupled into the inversion region 26 of capacitor 23. If the input signal had been false, the same coupling effect would have occurred except that no charge would have been coupled between the region 24 and capacitor 23.

Since region 17 is electrically connected to the substrate plate of capacitor 23 e.g. region 26 only while the clock signal $0_2$ is true, the clock signal $0_B$ must be true at least during a portion of the $0_2$ time. Otherwise when field effect transistor 13 is turned on by $0_B$, capacitor 23 will not have a substrate plate as described above.

If a false input had been provided at the input, no charge would have been coupled into capacitor 14 from capacitor 23 so that the voltage, approximately -V, across capacitor 12 would not change appreciably during $0_B$. If the voltage across capacitor 12 does not change during $0_B$, field effect transistor 6 remains on and the output does not change. Therefore, when the output does not change during $0_B$, for the embodiment shown, it can be concluded that the charge coupled circuit has a logic zero, or false, state.

On the other hand, if the input signal at the input was true and the charge representing the true signal level was coupled to capacitor 23 prior to or during $0_B$, the capacitor 23 would provide charge to allow inversion of the region 17 subjacent fixed plate 15 of capacitor 14. As a result, the voltage across capacitor 12 is reduced. The relative values of capacitor 12 and capacitor 14 when an inversion occurs is designed so that field effect transistor 6 is turned off and the output 7 changes from approximately electrical ground to approximately -V for a true input to the charge coupled circuit. Therefore, when the output changes from one voltage level i.e. electrical ground to a second voltage level i.e. approximately -V, the charge coupled circuit is indicated to have a true state.

Figure 4:
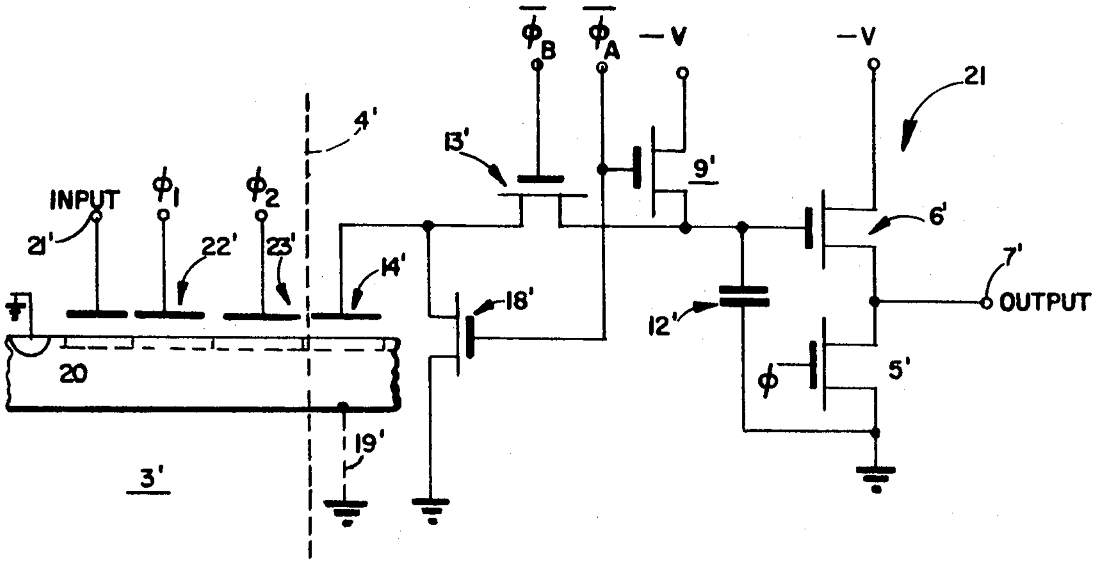
FIG. 4 is a partial schematic diagram of a second embodiment of a field effect transistor circuit sensing the state of a charge coupled circuit.
Figure 6:
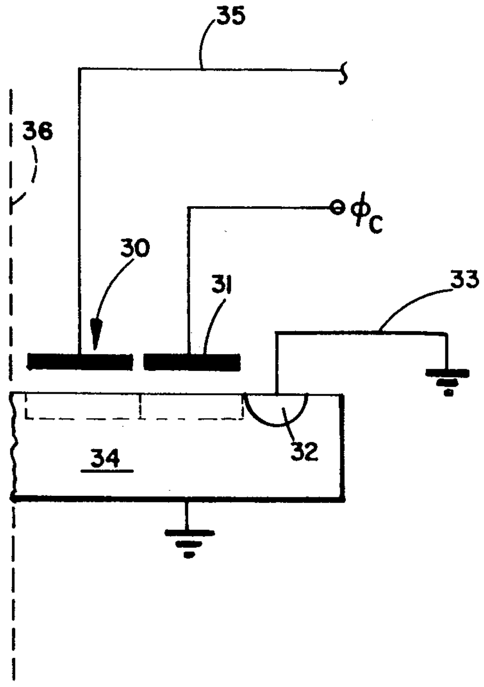
FIG. 6 is a partial schematic diagram of a substrate discharge circuit usable with the FIG. 1 and 4 embodiments.

During $0_C$ time, field effect transistor 18 is turned on to connect capacitor 14 to electrical ground. Field effect transistor 13 and 9 are both turned off during $0_C$ time. As a result, the charge on the fixed plate 15 is discharged to electrical ground to reset the charge coupled circuit prior to the next sensing cycle. An additional charge coupled device may be used to remove the charge from the inversion region subjacent the fixed plate. FIG. 6 illustrates one embodiment of a circuit which can be used to discharge the inversion region to electrical ground. The circuit comprises a field effect device which includes gate 31 connected to clock signal $0_C$ and diffused region 32 connected to electrical ground via conductor 33. Capacitor 30 for receiving charge from charge coupled circuit 36 is shown disposed over substrate 34. Conductor 35 from capacitor 30 is connected to the remainder of the sensing circuit (not shown). FIG. 4 is an illustration of a different embodiment of the output state 2 shown in FIG 1 with a charge sensing circuit 1′ and a charge coupled circuit 3′. In addition, the phase recurring clock signals $\overline{\phi_A}$ and $\overline{\phi_B}$ are spaced (Δt) so that there is no need for the clock signal $0_C$.

Figure 5:
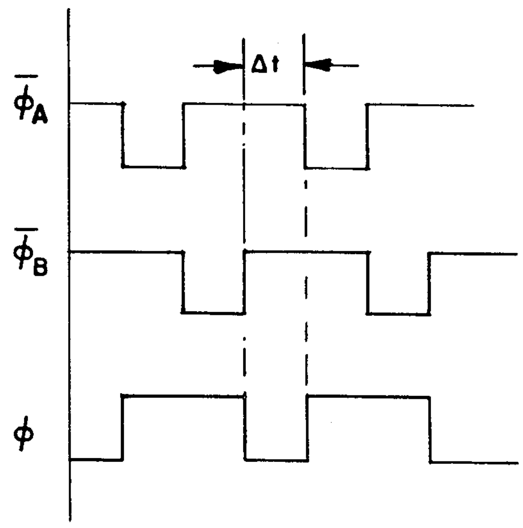
FIG. 5 is a signal diagram of the clock signal $\overline{\phi A}$ and $\overline{\phi B}$ which synchronize the operation of the FIG. 4 circuit.

The output stage 2′ in FIG. 4 comprises a source follower implemented by connecting field effect transistors 6′ in electrical series with field effect transistor 5′ between voltage source -V and electrical ground. The output 7′ is connected at a common point between the field effect transistors 5 and 6′. Electrically, the field effect transistor 5 in FIG. 1 is shifted from the position in FIG. 1 between the output 7 and -V to a position between output 7′ and electrical ground. Field effect transistor 5′ is shown as being gated by clock signal 0 which must be true at least following $\overline{\phi_B}$ and prior to $\overline{\phi_A}$ As shown by FIG. 5, in order to eliminate clock signal $0_C$ on the gate electrode of field effect transistor 18′, it is necessary to provide for a delay, Δt, between the end of $\overline{\phi_B}$ and the beginning of the next cycle of $\overline{\phi_A}$ Without the delay, it would be necessary to connect the gate electrode of field effect transistor 18′ to a third clock signal.

The operation of the FIG. 4 circuit is substantially the same as the operation of the FIG. 1 circuit. During $0_B$, if charge is provided to capacitor 14′ by the charge coupled circuit 3, the voltage across capacitor 12′ is substantially reduced for turning field effect transistor 6′ off. When field effect transistor 6′ is turned off, field effect transistor 5′ is turned on by clock signal 0 for connecting the output to electrical ground. Therefore, when charge coupled circuit 3′ has a true input, the output is false.

When charge coupled circuit 3′ provides no charge to capacitor 14′ during $0_B$, the voltage across capacitor 12′ is essentially unchanged so that field effect transistor 6′ remains on following $0_B$ and during 0. As a result, the voltage -V is divided between field effect transistors 6′ and 5′ for providing an output 7′ approximately equal to -V.

It is pointed out that *n* and *p* channel field effect transistors (MOS, MNOS, silicon gate etc.) can be used to implement the charge sensing circuit shown in the figures. The logic convention adapted for one application may be changed to satisfy the requirements of a different application. Although singe phase clock signals are shown for synchronizing the operation of the circuit, it should be understood that in some cases both major and minor phase clock signals (double width and single width) clock signals can be used.

It should be understood that capacitors 12 and 14 may be scaled as required to satisfy the requirements of a particular application. In addition, the capacitances of the capacitors may also be scaled to optimize the signal noise ratio. The equation set forth in the background description may be used in selecting an appropriate ratio between the capacitors.

I claim:

1. A circuit for sensing the logic state represented by the charge of a charge coupled circuit comprising,
   - a first capacitor,
   - a first field effect transistor charging said first capacitor to a first voltage level during a first phase recurring interval,
   - a second capacitor means including a fixed plate disposed over and insulated from a semiconductor region,
   - a second field effect transistor for electrically connecting said first capacitor to the fixed plate of said second capacitor means during a second phase recurring interval for inducing an inversion layer in the semiconductor region subjacent said fixed plate if charge is provided by said charge coupled circuit, said inversion layer being electrically connected to said charge coupled circuit, if charge is not provided a depletion region is formed under said fixed plate,
   - said charge on said first capacitor being distributed to said second capacitor means during said second phase recurring interval for changing the voltage on said first capacitor as a function of the logic state of said charge coupled circuit,
   - output means responsive to the voltage on said first capacitor for providing an output voltage level representing the logic state of said charge coupled circuit following said second phase recurring interval.

2. The circuit recited in claim 1 wherein said second field effect transistor means is connected in electrical series between said first capacitor and second capacitor means, and
   - said first field effect transistor is connected between said first capacitor means and said first voltage level.

3. The circuit recited in claim 2 further including,
   - a third field effect transistor for discharging charge on the fixed plate of said second capacitor means to a reference voltage level following said second phase recurring interval.

4. The circuit recited in claim 3 further including a resetting field effect device connected between the region subjacent said fixed plate and a reference voltage level for discharging said region to said reference voltage level following said second phase recurring interval.

5. The circuit recited in claim 2 wherein said second field effect transistor means is rendered nonconductive following said second phase recurring interval for isolating said first capacitor from said second capacitor means,
   - third field effect means for connecting said second capacitor means to a reference voltage level following said second phase recurring interval.

6. The circuit recited in claim 1 wherein said output means responsive includes an output field effect transistor having its gate electrode connected to said first capacitor means for responding to the voltage on said capacitor means, said output field effect transistor being rendered nonconductive when said charge coupled circuit provides charge to said second capacitor means during said second phase recurring interval, said output field effect transistor being rendered conductive when said charge coupled circuit provides no charge to said second capacitor means during said second phase recurring interval.

7. The circuit recited in claim 6 wherein said output means comprises an inverter circuit for providing an output voltage level representing an inversion of the logic state of the charge coupled circuit.

8. The circuit recited in claim 6 wherein said output means comprises a source follower circuit for providing an uninverted output voltage representing the state of the charge coupled circuit.

9. The circuit recited in claim 1 wherein said first capacitor and second capacitor means have a ratio for reducing the voltage across said first capacitor as a function of the logic state of charge from the charge coupled circuit whereby the output means responds to the reduced voltage across said first capacitor means.

* * * * *